United States Patent Office

3,260,707
Patented July 12, 1966

3,260,707
ALLYL AND METHALLYL ESTERS OF SULFO-ALIPHATIC ACIDS, AND INTERPOLYMERS THEREOF WITH ACRYLONITRILE
John R. Caldwell and George P. Touey, Kingsport, Tenn., assignors to Eastman Kodak Company, Rochester, N.Y., a corporation of New Jersey
No Drawing. Filed Oct. 24, 1962, Ser. No. 232,900
15 Claims. (Cl. 260—79.3)

This invention relates to allyl and methallyl esters of certain sulfo-aliphatic carboxylic acids and salts, to resinous interpolymers thereof with acrylonitrile, and to methods for preparing these compounds.

The new class of monomeric esters of our invention are represented by the following general structural formula:

(I) 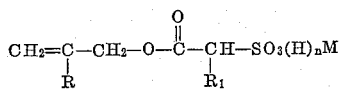

wherein $n$ is zero when M is an alkali metal and 1 when M is a tertiary amine, R represents a hydrogen atom or a methyl group, $R_1$ represents a hydrogen atom or a straight or branched chain alkyl group of from 1 to 7 carbon atoms, and M represents an alkali metal atom such as sodium, potassium, or lithium or a molecule of a tertiary aliphatic amine of from 3 to 12 carbon atoms, for example, trimethylamine, tributylamine, etc., or a 5- or 6-membered heterocyclic tertiary amine containing in the ring just carbon from 4 to 5 atoms and a single nitrogen atom, for example, pyrrole, pyridine, etc. The new compounds above defined are especially useful for the preparation of interpolymers with acrylonitrile, wherein the acrylonitrile units constitute at least 50% by weight of the polymer molecule. Fibers prepared from these interpolymers are characterized by strong affinity for basic dyes and relatively high hot bar sticking points in the 200–250° C. range, and the dyed fibers show excellent fastness toward light, laundering and dry-cleaning.

It is an object of the invention, therefore, to provide a new class of monomeric allyl and methallyl esters of sulfo-carboxylic acids and salts thereof as above defined. Another object is to provide resinous interpolymers, bipolymers and tripolymers containing at least 50% by weight of acrylonitrile units. Another object is to provide fibers from such interpolymers that have improved dyeability. Another object is to provide processes for preparing the new monomeric compounds and polymers thereof. Other objects will become apparent from the description and the examples.

In accordance with the invention, we prepare our new monomeric compounds by any of the methods known to the art for making esters from aliphatic alcohols. One convenient method is to reflux a mixture of allyl or methallyl alcohol with the sulfo acid monobasic salt, in the presence of the usual esterification catalyst and an azeotroping solvent. This method is described in greater detail hereinafter.

The polymerization of the new compounds of the invention conjointly with acrylonitrile or with acrylonitrile and another different polymerizable monomer containing a —C=C< or a $CH_2$=C< group is accelerated by heat, by actinic light such as ultraviolet radiation and by polymerization catalysts which are known to promote the polymerization of vinyl and other unsaturated organic compounds such as peroxides including benzoyl peroxide, acetyl peroxide, lauroyl peroxide, tertiary butyl hydroperoxide, cumene hydroperoxide, hydrogen peroxide, etc., persulfates such as ammonium, sodium or potassium persulfates, perborates such as sodium perborate and other alkali metal perborates, the water-soluble salts of percarbonic acid, azo-bis-isobutyronitrile, and the like. Mixtures of one or more of these catalysts can be used. The amount of catalyst can vary about from 0.2–3.0%, or even more, based on the weight of monomer to be polymerized. An activating agent such as sodium bisulfite, iron salts, etc. can be used, if desired, in conjunction and in about equal amount with the polymerization catalysts in aqueous systems. The temperature of polymerization can vary over a wide range, but preferably in the range of 10–100° C. Chain regulators such as alkyl mercaptans, e.g. hexyl, octyl, lauryl, dodecyl mercaptans, etc. can also be added with advantage to the polymerization mixtures. Pressures at normal atmospheric are preferred, although efficacious polymerizations can also be carried out at pressures substantially below or above normal atmospheric pressures.

The polymerizations can be carried out in mass, in solution or in a nonsolvent for the monomers, water being an especially suitable nonsolvent. In aqueous systems, a sufractant can be used with advantage in amount not exceeding about 5% of the weight of the starting monomers. Suitable agents of this kind include salts of higher fatty acids, e.g. sodium or potassium stearate, palmitate, etc., ordinary soaps, salts of higher fatty alcohol sulfates, e.g., sodium or potassium cetyl sulfate, sodium or potassium lauryl sulfate, etc., salts of aromatic sulfonic acids, e.g., sodium or potassium salts of alkylnaphthalene sulfonic acids, polyethylene oxide derivatives, and the like.

In the solution polymerization technique, organic solvents can be used that are solvents for the starting monomers, but nonsolvents for the resulting interpolymers. Examples of solvents of this kind are alcohols, ketones, esters, glycols and ethers of which methanol, acetone, ethyl acetate, ethylene glycol and Cellosolve are examples. Solution polymerization can also be carried out efficaciously in a medium that is a solvent for the polymer and the resulting solution or dope can be used directly for spinning fibers and filaments. Suitable solvents for this purpose include the known polyacrylonitrile solvents such as, for example, dimethylformamide, dimethylacetamide, gamma-butyrolactone, ethylene carbonate, dimethylsulfoxide and N-methyl pyrrolidone. Suitable catalysts for use in the above organic media include the aforementioned organic peroxides such as benzoyl peroxide, acetyl peroxide, cumene hydroperoxide, tert-butyl hydroperoxide, etc. In some cases, persulfates may be used.

The resinous interpolymers of the invention prepared in accordance with the above procedures contain in the polymer molecule in the case of the bipolymers from 2–20% and preferably from 4–15% by weight of the esters of the invention defined by above structural Formula I and from 98–80% and preferably from 96–85% by weight of acrylonitrile, and in the case of the terpolymers of the invention from 2–20% by weight of the esters of structural Formula I, from 50–93% by weight of acrylonitrile and from 3–48% by weight of a different polymerizable monomer containing a —CH=C< or $CH_2$=C< group. The interpolymers have been found to contain substantially the same proportions of substitutents as employed in the starting polymerization mixtures. They may be converted into fibers by the usual wet or dry spinning methods. Basic dyes that can be used to color the interpolymer compositions deep and uniform shades include Sevron Blue B (Color Index No. Basic Blue 21), Sevron Brilliant Red 4G (C.I. No. Basic Red 14), Sevron Green B (C.I. No. Basic Green 3), Sevron Yellow L (C.I. No. Basic Yellow 13), Auramine SP (C.I. No. Basic Yellow 2), Calcozine Orange RS (C.I. No. Basic Orange 1), Rhodamine 5G (C.I. No. Basic Red 1), Bismarck Brown (C.I. No. Basic Brown 4) and Methyl Violet (C.I. No. Basic Violet 1). Reference can be had to the above dyes in Amer. Assoc. Textile Chemists and Colorists, 35, (1959).

Suitable different polymerizable monomers containing a —CH=C< or CH$_2$=C< group include styrenes, e.g. styrene, α-methylstyrene, p-acetaminostyrene, etc., vinyl and isopropenyl carboxylates wherein the carboxylate group is the radical of a saturated aliphatic or aromatic carboxylic acid containing from 2–17 carbon atoms, e.g., vinyl acetate, vinyl butyrate, vinyl stearate, vinyl benzoate and the corresponding isopropenyl esters, vinyl alkyl ethers, and vinyl alkyl ketones wherein the alkyl group contains from 1 to 4 carbon atoms, or more, e.g., vinyl methyl ether, vinyl butyl ether, vinyl methyl ketone, etc., vinyl sulfonamides, e.g., vinyl sulfonamide, N-methyl vinyl sulfonamide, etc., vinyl halides, e.g., vinyl chloride, vinyl bromide, vinyl fluoride, vinylidene halides, e.g., vinylidene chloride, vinylidene fluoride, vinylidene chloride-bromide, etc. vinylidene cyanide, acrylic acid and its derivatives, e.g., acrylamide, N-alkyl acrylamides, N,N-dialkyl acrylamides, alkyl esters such as methyl, ethyl, propyl, butyl, benzyl, phenyl acrylates, etc., and methacrylic acid and its corresponding amides, nitrile esters, etc., and the like. The monomeric amides, imides, and esters of bicyclo[2,2,1]-5-heptene carboxylic acids disclosed in J. R. Caldwell, U.S. Patents Nos. 2,706,720 and 2,706,721, dated April 19, 1955, are especially useful as the third component in the terpolymers of the invention. It will be understood that in the above listing the said alkyl groups, unless otherwise specified, contain from 1–4 carbon atoms.

The following examples will serve to illustrate further the new monomers and interpolymers of the invention and the manner for preparing the same.

*Example 1.—Allyl sulfoacetate, pyridine salt*

A. A mixture of 116 g. (2 moles) of allyl alcohol, 219 g. (1 mole) of sulfoacetic acid monopyridine salt, 100 cc. of toluene and 1.0 g. of methanesulfonic acid catalyst was refluxed for 8 hours. During this period, the water formed was removed azeotropically by means of a Dean-Stark tube. After the calculated amount of water (18 g.) had been removed, the catalyst was neutralized with sodium carbonate and the excess alcohol and toluene were removed under reduced pressure. The yield of allylsulfoacetate pyridine salt was 91.5% based on the sulfoacetic acid salt. The reaction can be illustrated by the following:

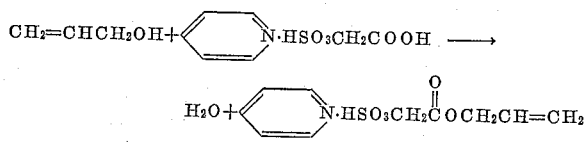

Analysis of the product showed a sulfur content of 12.2% by weight compared with calculated for C$_{10}$H$_{13}$NO$_5$S of 12.4%.

In the above method, the carboxyl group in the sulfoaliphatic carboxylic acid salt must be free and the sulfonate group must be present as a salt. If both acidic groups are free, the strong α-sulfocarboxylic acid quickly chars the unsaturated alcohol during the esterification. On the other hand, if both groups are in a combined form as the metal or amine salts, the product is not capable of esterifying the alcohol. The pyridine salt of the unsaturated alcohol ester of the sulfo acid can be used directly to form the acrylonitrile interpolymers of the invention or it can be converted to the sodium salt by treatment with a calculated amount of sodium acetate and then used in the polymerizations.

*Example 2.—Allyl sulfoacetate, sodium salt*

A. Another method for making the sulfo acid ester is to employ α-chloroaliphatic acids or their anhydrides as the esterifying agent for the allyl or methallyl alcohols. After this ester is formed and isolated, it is then reacted with sodium sulfite to form the sodium salt. The following illustrates the reaction steps:

(a)
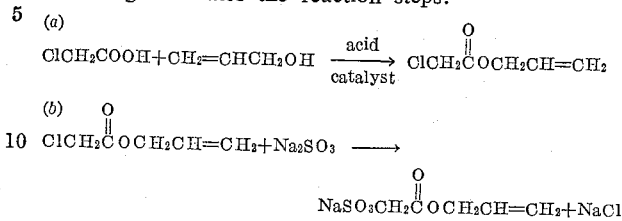

(b)
ClCH$_2$COCH$_2$CH=CH$_2$+Na$_2$SO$_3$ ⟶

NaSO$_3$CH$_2$COCH$_2$CH=CH$_2$+NaCl

B. The preferred method, however, is through the direct esterification of the unsaturated alcohol with the sulfoacetate intermediate,

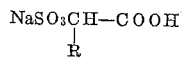

in the general manner as in above method A. However, in this case the amount of toluene or other inert azeotroping agent is reduced to a minimum to allow the above salt to be at least partially soluble in the esterifying mixture. For this reason, it is desirable but not necessary, to use amine salts of the sulfo aliphatic acids in the esterification instead of the alkali metal salts.

Analysis of the product obtained by the above methods A and B showed it to have a sulfur content of 15.7% by weight as compared with calculated for C$_5$H$_7$O$_5$SNa of 15.8% for sulfur.

*Example 3.—Methallyl sulfoacetate, pyridinium salt*

Methallyl alcohol was used in place of the allyl alcohol as described in Example 1, to give methallyl sulfoacetate, pyridinium salt. The potassium salt was made by treatment of the pyridinium salt with potassium carbonate. Analysis for sulfur indicated that the potassium salt of methallyl sulfoacetate had been obtained.

*Example 4.—Acrylonitrile/allyl sulfoacetate, sodium salt interpolymer*

The following materials were placed in a flask:

| | G. |
|---|---|
| Acrylonitrile | 90.0 |
| Allylsulfoacetate, Na salt | 10.0 |
| Potassium persulfate | 1.0 |
| Sodium bisulfite | 0.5 |
| Water | 1500.0 |

The mixture was agitated at 50° C. for 16 hours in a nitrogen atmosphere. The polymer separated out as small granules which were collected on a filter and washed with water. The yield of an interpolymer of approximately 90% by weight of acrylonitrile and 10% by weight of allyl sulfoacetate, sodium salt was 85–90 g. after drying. This polymer dissolved readily in dimethylformamide to form a smooth dope. The dope was extruded through a spinnerette into a hot air cabinet. After drafting and heat-setting, the fibers dyed well with the mentioned basic dyes.

*Example 5.—Acrylonitrile/methallyl sulfoacetate, potassium salt interpolymer*

The following materials were placed in a flask:

| | G. |
|---|---|
| Acrylonitrile | 95.0 |
| Methallyl sulfoacetate, K salt | 5.0 |
| Ammonium persulfate | 1.0 |
| Sodium lauryl sulfate | 2.0 |
| Water | 1000.0 |

The mixture was agitated at 60° C. for 20 hours in a nitrogen atmosphere. The resulting suspension was coagulated with sodium sulfate and the polymer was washed with water and dried. The yield of polymer was 90–95 g. and analysis for sulfur indicated it was an interpolymer of approximately 95% by weight of acrylonitrile and 5% by weight of methallyl sulfoacetate, K salt. Fibers made from this interpolymer dyed well with the mentioned basic dyes.

*Example 6.—Acrylonitrile/allyl sulfoacetate, sodium salt/ bicyclo[2,2,1]-5-heptene-2,3-dicarboxylic acid diethyl ester interpolymer*

Using the method described in Example 5, an interpolymer was made from 65 parts by weight of acrylonitrile, 25 parts by weight of bicyclo[2,2,1]-5-heptene-2, 3-dicarboxylic acid diethyl ester and 10 parts by weight of allyl sulfoacetate, sodium salt. Fibers spun from the composition showed good dyeing with the mentioned basic dyes.

*Example 7.—Acrylonitrile/allyl sulfobutyrate, sodium salt, methacrylonitrile interpolymer*

Using the method described in Example 5, an interpolymer was made from 85 parts by weight of acrylonitrile, 10 parts by weight of methacrylonitrile and 5 parts by weight of allyl sulfobutyrate. Fibers made from this composition dyed well with the mentioned basic dyes.

*Example 8.—Acrylonitrile/allyl sulfoacetate, lithium salt, interpolymer*

This example illustrates a preferred embodiment of the invention wherein the polymerization is carried out in a solvent for the polymer. The resulting viscous solution can be used directly for spinning fibers.

92 g. of acrylonitrile and 8 g. of allyl sulfoacetate, lithium salt, and 1.0 g. of potassium persulfate were added to 200 g. of dimethylformamide. The mixture was stirred at 50–60° C. for 24 hours. The yield of an interpolymer of approximately the composition 92% by weight of acrylonitrile and 8% by weight of allyl sulfoacetate, Li salt, was 94–96%. The clear, smooth dope obtained was spun to give fibers of excellent physical properties that dyed well with the mentioned basic dyes.

*Example 9.—Acrylonitrile/allyl sulfoacetate, sodium salt/ methyl acrylate interpolymer*

93 g. of acrylonitrile, 4 g. of methyl acrylate, 3 g. of sodium allyl sulfoacetate and 1.0 g. of ammonium persulfate were added to 400 g. of ethylene carbonate. The mixture was stirred at 50° C. for 24 hours. A yield of 95–98% of polymer having the composition of approximately 93% by weight of acrylonitrile, 3% by weight of sodium allyl sulfoacetate and 4% by weight of methyl acrylate was obtained. 40 g. of water was added, and the clear, smooth solution was spun to give fibers which dyed well with the mentioned basic dyes.

*Example 10.—Acrylonitrile/allyl sulfoacetate, pyridine salt interpolymer*

The following materials were placed in a flask:

| | G. |
|---|---|
| Acrylonitrile | 85.0 |
| Allyl sulfoacetate, pyridine salt | 15.0 |
| Ammonium persulfate | 1.0 |
| Dimethylformamide | 300.0 |

The mixture was stirred in an atmosphere of nitrogen at 35–40° C. for 18 hours. A clear, smooth dope was formed. The dope was wet-spun into a bath consisting of dimethylformamide and water. After the fibers were drafted and heat-set they had the following properties: 2.85 g. per denier, 15% elongation, 231–245° C. hot bar sticking temperature, 5.2% moisture regain. They dyed readily with the mentioned basic dyes. Analysis of the fibers showed that they contained approximately 15% by weight of the allyl sulfoacetate salt.

*Example 11.—Acrylonitrile/allyl sulfoacetate, pyridine salt, interpolymer*

Using the method described in Example 10, an interpolymer was made from 90 parts by weight of acrylonitrile and 10 parts by weight of allyl sulfoacetate, pyridine salt. The fibers obtained dyed well with the mentioned basic dyes.

*Example 12.—Acrylonitrile/allyl sulfoacetate, sodium salt, interpolymer*

A mixture of 93 parts by weight of acrylonitrile and 7 parts by weight of allyl sulfoacetate, sodium salt was polymerized in ethylene carbonate using ammonium persulfate as the catalyst. Fibers made from the dope dyed well with the mentioned basic dyes.

*Example 13.—Acrylonitrile/allyl sulfononanoate, sodium salt interpolymer*

The process of above Example 4 was repeated with the following mixture:

| | G. |
|---|---|
| Acrylonitrile | 90.0 |
| Allyl sulfononanoate, Na salt | 10.0 |
| Potassium persulfate | 1.0 |
| Sodium bisulfite | 0.5 |
| Water | 1500.0 |

The interpolymer obtained dissolved readily in dimethylformamide to form a smooth dope. The fibers produced therefrom dyed well with the mentioned basic dyes.

By following the procedures set forth in the preceding examples, other interpolymers coming within the scope of the invention can be prepared from acrylonitrile alone, or conjointly with one or more of the mentioned different polymerizable monomers, with the new class of allyl and methallyl esters of the invention. Also, other sulfo-aliphatic acid esters coming within the definition can be substituted in the various examples such as the allyl or methallyl esters of sulfopropionate salts or sulfovalerate salts or sulfocaproate salts or sulfohexanoate salts. It will be understood that the interpolymers can be readily converted from the salt forms to the free acids which can then be further converted to derivatives thereof by treatment with reagents capable of reacting with free sulfonic acid groups. The interpolymers of the invention can also be coated into flexible sheets from their solutions or dopes. If desired, such solutions may have incorporated therein suitable fillers, dyes, pigments, lubricants, plasticizers, and the like.

The invention has been described in detail with particular reference to preferred embodiments thereof, but it will be understood that other variations and modifications can be affected within the spirit and scope of the invention as described hereinabove and as defined in the appended claims.

What we claim is:

1. A polymer selected from the group consisting of (1) a bipolymer of from 2–20% by weight of a salt compound represented by the general formula:

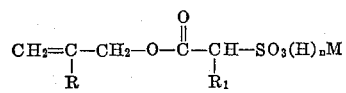

and from 98–80% by weight of acrylonitrile, and (2) a terpolymer of from 2–20% by weight of the said salt compound and from 50–93% by weight of acrylonitrile and from 3–48% by weight of a different polymerizable compound containing a —CH=C< group, wherein R represents a member selected from the group consisting of a hydrogen atom and a methyl group, $R_1$ represents a member selected from the group consisting of a hydrogen atom and an alkyl group of from 1–7 carbon atoms, and M represents a member selected from the group consisting of an alkali metal atom, a saturated tertiary aliphatic amine of from 3–12 carbon atoms, and a tertiary heterocyclic amine containing in the ring from 4–5 carbon atoms and a single nitrogen atom, and wherein $n$ is zero when M represents the said alkali metal ion and 1 when M represents the said tertiary amine.

2. A polymer selected from the group consisting of (1) a bipolymer of from 2–20% by weight of a salt compound represented by the general formula:

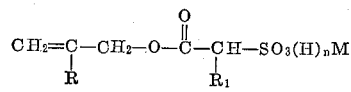

and from 98–80% by weight of acrylonitrile, and (2) a terpolymer of from 2–20% by weight of the said salt compound and from 50–93% by weight of acrylonitrile and from 3–48% by weight of a different polymerizable compound selected from the group consisting of styrene, α-methylstyrene, p-acetaminostyrene, a vinyl ester, a vinyl alkyl ether, a vinyl alkyl ketone, a vinyl sulfonamide, a vinyl halide, a vinylidene halide, vinylidene cyanide, acrylic acid, alkyl acrylates, acrylamide, N-alkyl acrylamides, N,N-dialkyl acrylamides, methacrylic acid, alkyl methacrylates, methacrylonitrile, methacrylamide, N-alkyl methacrylamides, N,N-dialkyl methacrylamides, bicyclo[2,2,1]-5-heptene mono and dicarboxylic acids and alkyl esters thereof, wherein the said alkyl group in each instance contains from 1–4 carbon atoms, wherein R represents a member selected from the group consisting of a hydrogen atom and a methyl group, $R_1$ represents a member selected from the group consisting of a hydrogen atom and an alkyl group of from 1–7 carbon atoms, and M represents a member selected from the group consisting of an alkali metal atom, a saturated tertiary aliphatic amine of from 3–12 carbon atoms, and a tertiary heterocyclic amine containing in the ring from 4–5 carbon atoms and a single nitrogen atom, and wherein $n$ is zero when M represents the said alkali metal ion and 1 when M represents the said tertiary amine.

3. A bipolymer of from 2–20% by weight of the sodium salt of allyl sulfoacetate and from 98–80% by weight of acrylonitrile.

4. A bipolymer of from 2–20% by weight of the lithium salt of allyl sulfoacetate and from 98–80% by weight of acrylonitrile.

5. A terpolymer of from 2–20% by weight of the sodium salt of allyl sulfobutyrate, from 50–93% by weight of acrylonitrile and from 3–48% by weight of methacrylonitrile.

6. A terpolymer of from 2–20% by weight of the sodium salt of allyl sulfoacetate, from 50–93% by weight of acrylonitrile, and from 3–48% by weight of bicyclo-[2,2,1]-5-heptene-2,3-dicarboxylic acid diethyl ester.

7. A terpolymer of from 2–20% by weight of the sodium salt of allyl sulfoacetate, from 50–93% by weight of acrylonitrile, and from 3–48% by weight of methyl acrylate.

8. A fiber prepared from a polymer of the composition of claim 1.

9. A compound represented by the general structural formula:

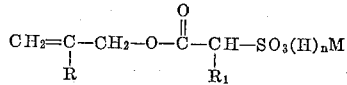

wherein R represents a member selected from the group consisting of a hydrogen atom and a methyl group, $R_1$ represents a member selected from the group consisting of a hydrogen atom and an alkyl group of from 1–7 carbon atoms, and M represents a member selected from the group consisting of an alkali metal atom, a saturated tertiary aliphatic amine of from 3–12 carbon atoms, and tertiary heterocyclic amine containing in the ring from 4–5 carbon atoms and a single nitrogen atom, and wherein n is zero when M represents the said alkali metal atom and 1 when M represents the said tertiary amine.

10. Pyridine salt of allyl sulfoacetate.
11. Sodium salt of allyl sulfoacetate.
12. Potassium salt of methallyl sulfoacetate.
13. Sodium salt of allyl sulfobutyrate.
14. Lithium salt of allyl sulfoacetate.
15. The compounds of claim 1 in their free sulfonic acid forms.

References Cited by the Examiner
UNITED STATES PATENTS

| | | | |
|---|---|---|---|
| 2,496,275 | 2/1950 | Dickey | 260—79.3 |
| 2,601,256 | 6/1952 | Bruson | 260—79.3 |

JOSEPH L. SCHOFER, *Primary Examiner.*

JAMES A. SEIDLECK, *Examiner.*

E. J. SMITH, *Assistant Examiner.*